Oct. 4, 1955
P. C. DARIN ET AL
2,719,698
EARTH BORING APPARATUS
Filed Feb. 1, 1951
7 Sheets-Sheet 1
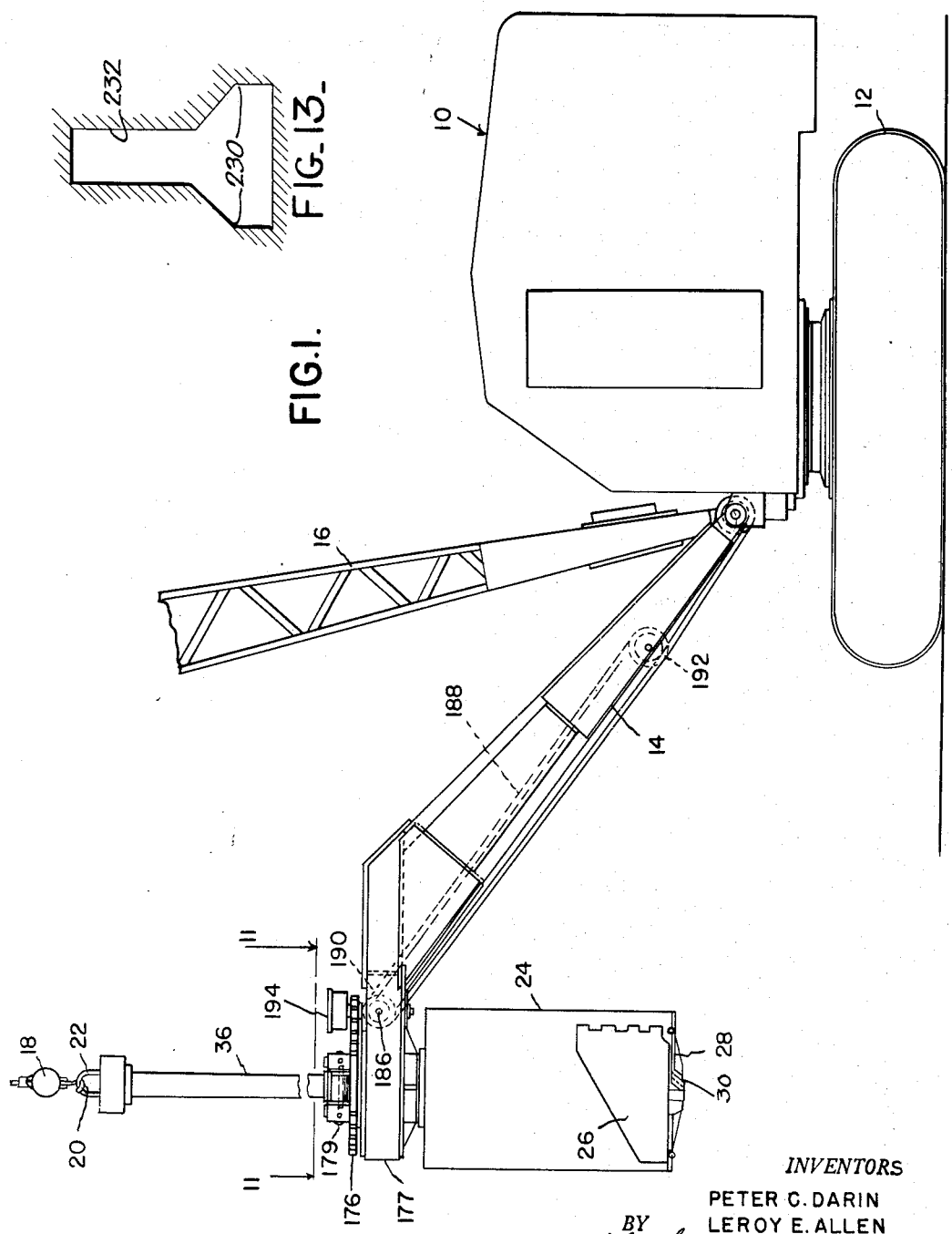
INVENTORS
PETER C. DARIN
LEROY E. ALLEN
BY
Whittemore, Hulbert
& Belknap
ATTORNEYS

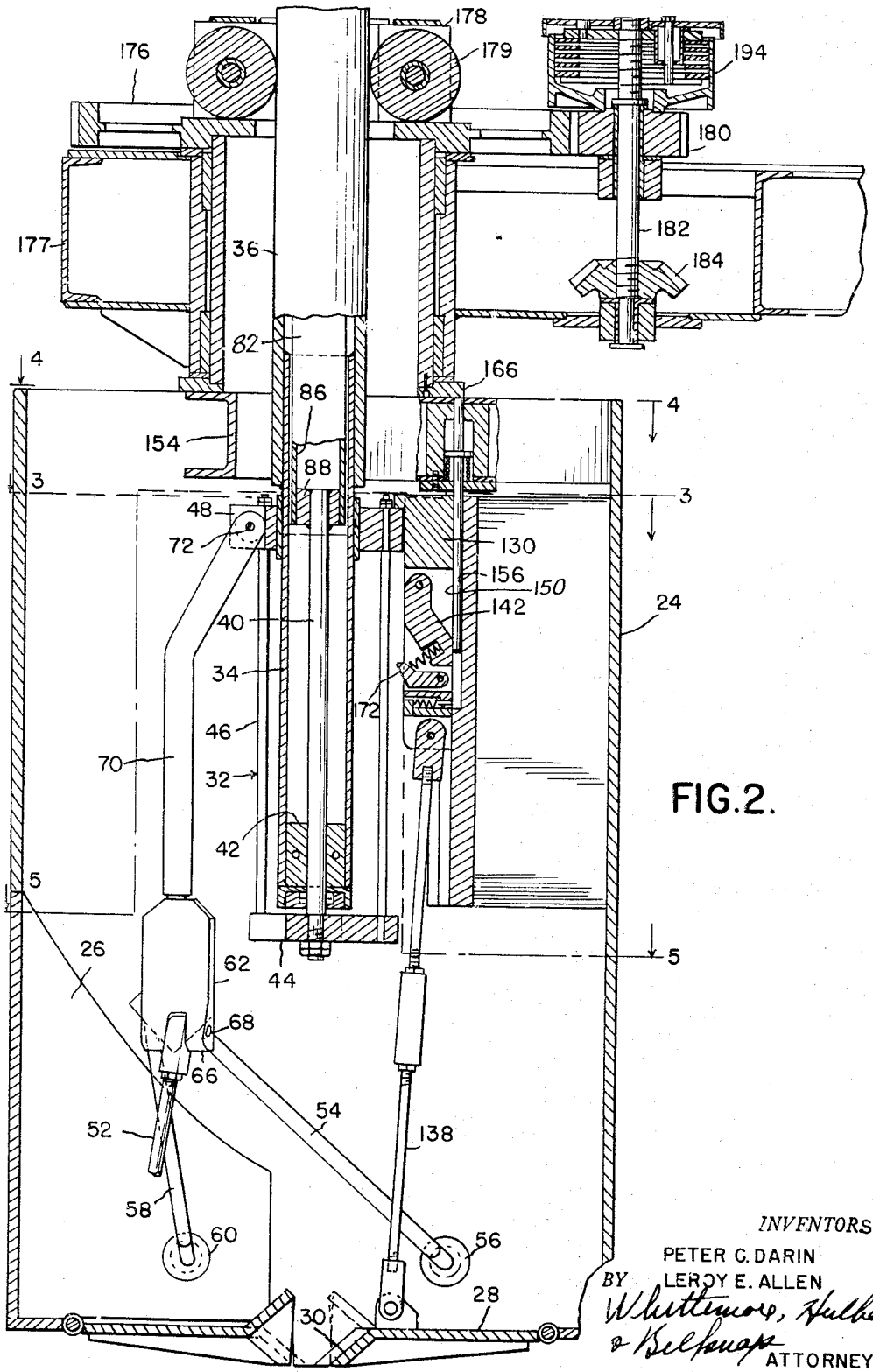

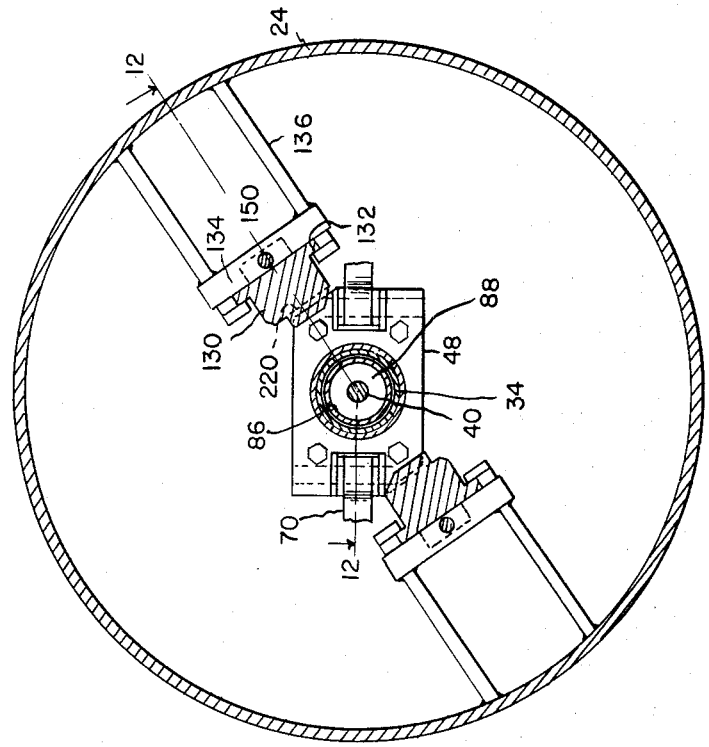
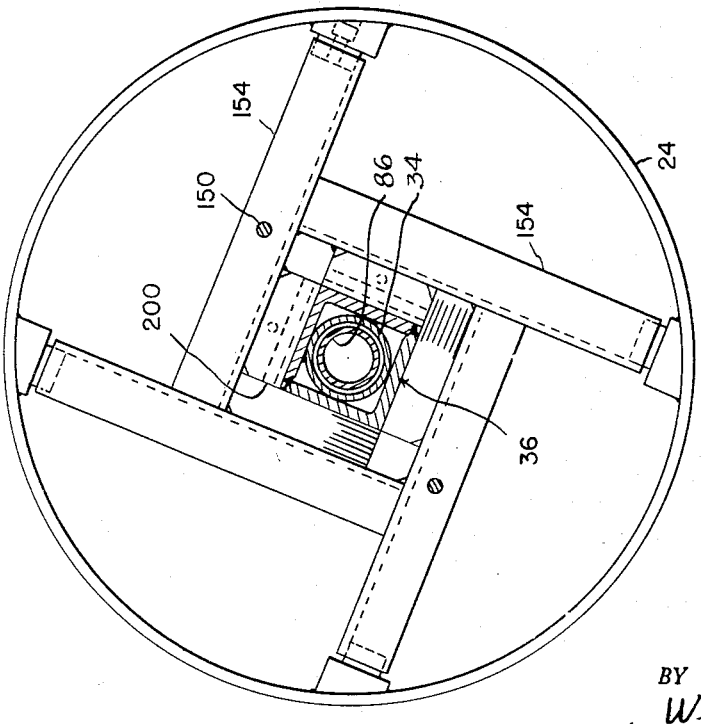

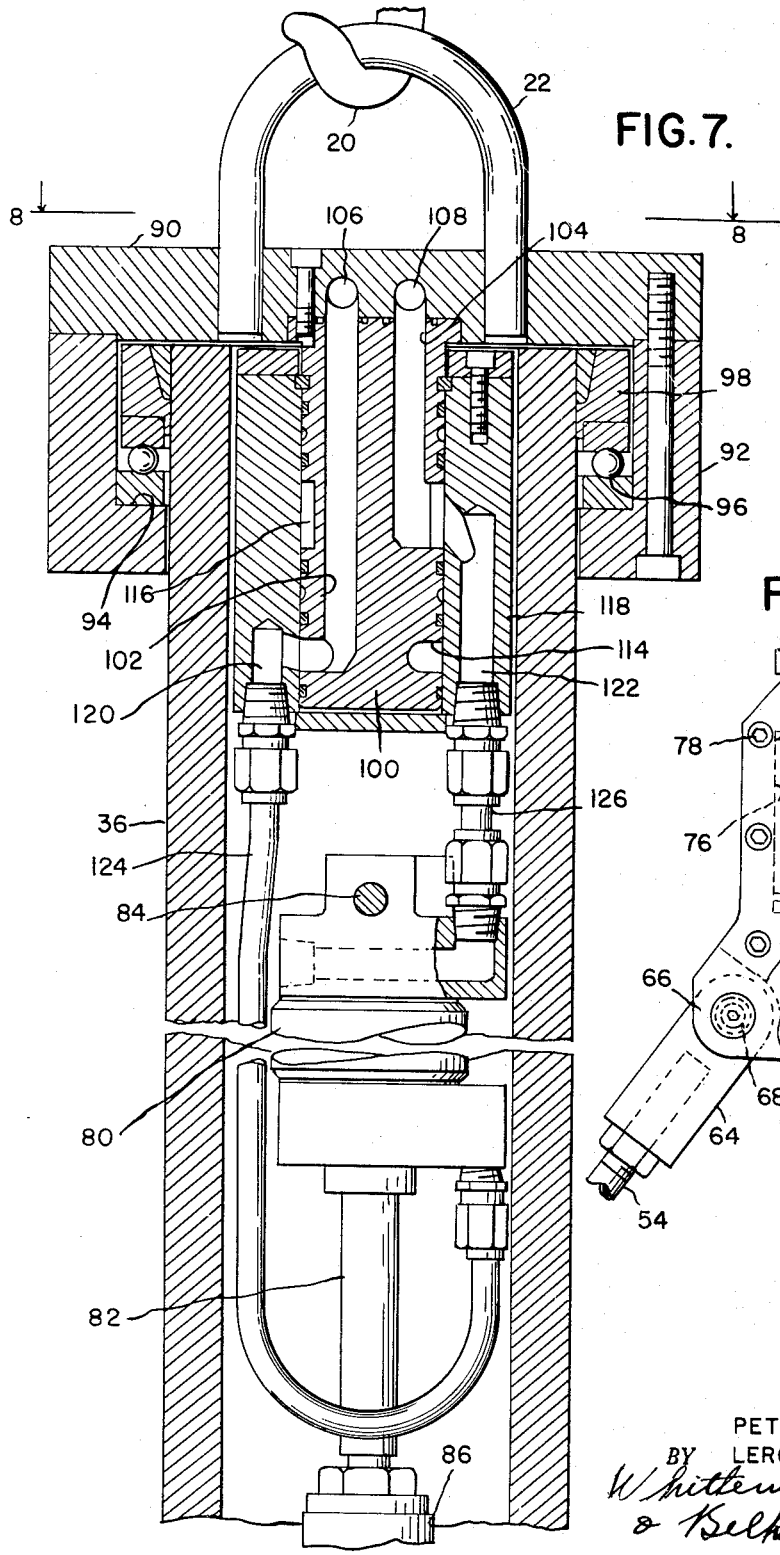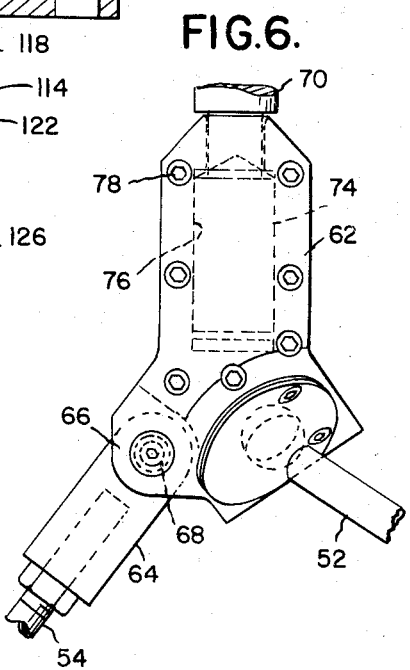

Oct. 4, 1955    P. C. DARIN ET AL    2,719,698
EARTH BORING APPARATUS

Filed Feb. 1, 1951    7 Sheets-Sheet 5

INVENTORS
PETER C. DARIN
LEROY E. ALLEN
BY Whittemore, Hulbert
& Belknap
ATTORNEYS Oct. 4, 1955  P. C. DARIN ET AL  2,719,698
EARTH BORING APPARATUS Filed Feb. 1, 1951    7 Sheets-Sheet 6

INVENTORS
PETER C. DARIN
LEROY E. ALLEN
BY
Whittemore, Hulbert
& Belknap
ATTORNEYS

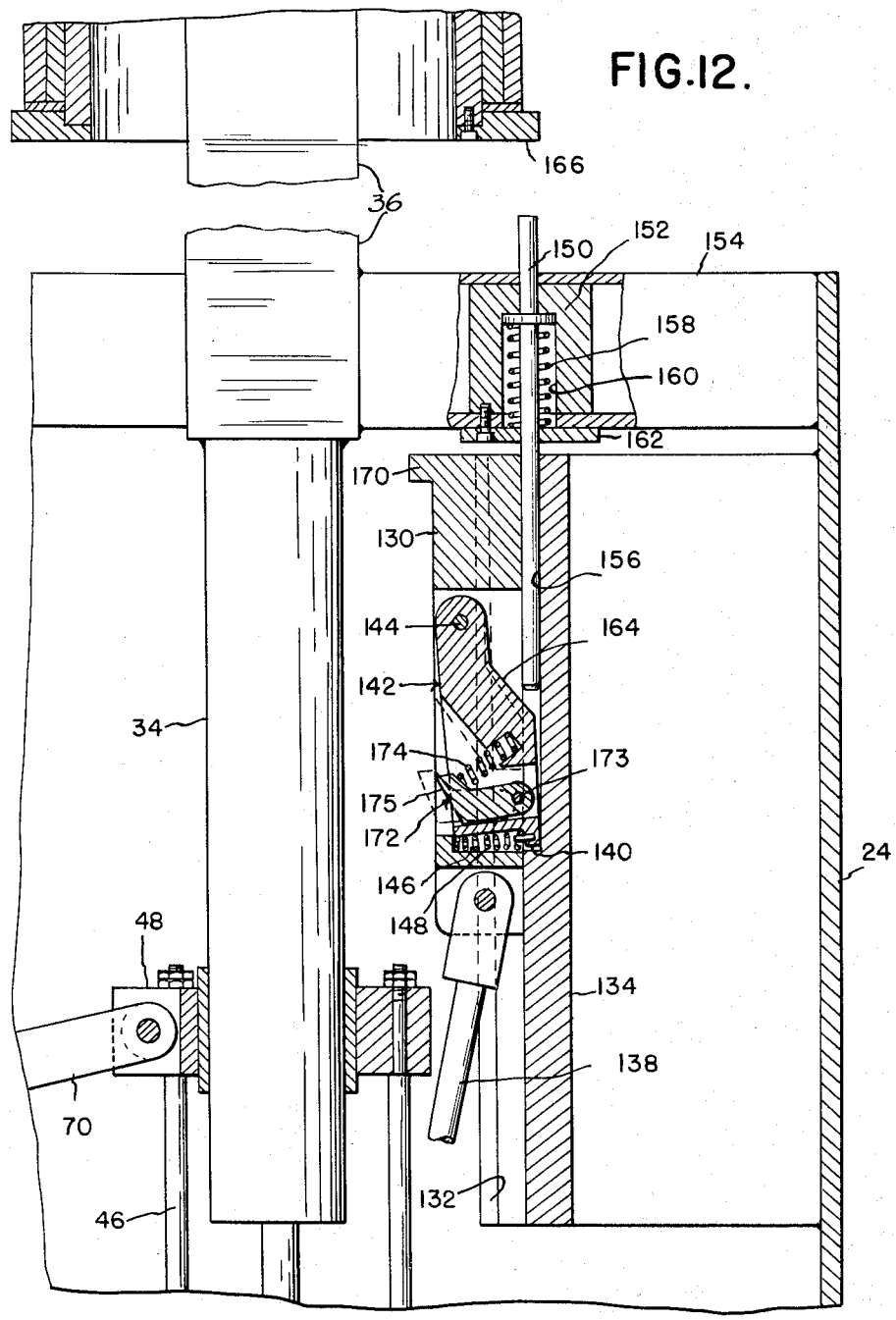

United States Patent Office 2,719,698
Patented Oct. 4, 1955

2,719,698

EARTH BORING APPARATUS

Peter C. Darin, Detroit, and Le Roy E. Allen, Grosse Pointe Woods, Mich., assignors, by direct and mesne assignments, to Darin & Armstrong, Incorporated, Detroit, Mich., a corporation of Michigan Application February 1, 1951, Serial No. 208,874

27 Claims. (Cl. 255—19)

The present invention relates to earth boring apparatus, and more particularly to apparatus designed to bore a relative large hole in the earth to substantial depth and thereafter to effect a lateral enlargement or "belling" of the hole.

It is an object of the present invention to provide apparatus of the character described, characterized by its ruggedness, its simplicity, its positive control of the several separate functions, the economy with which it may be produced, and its overall efficiency in operation.

More specifically, it is an object of the present invention to provide apparatus of the character described including a bucket having laterally movable belling blades and downwardly movable dump doors in combination with a hydraulic power device for selectively effecting control of the blades and doors.

It is a further object of the present invention to provide apparatus of the character described comprising a hydraulic power cylinder and piston located adjacent the top of a hollow drive shaft, a piston rod connected to the piston and extending downwardly through the shaft into a bucket located at the lower end thereof, and mechanical means for connecting the lower end of the piston rod to the belling blades and to the dump doors.

It is a further object of the present invention to provide improved mechanism for effecting positive and equal control of a pair of belling blades.

It is a feature of the present invention to provide a novel type of tripod toggle for effecting lateral swinging movement of belling blades characterized by the possibility of effecting full opening movement of the blades under full control of the operator.

It is a further feature of the present invention to provide dump doors on a bucket including latch means for retaining the doors closed, means for releasing the latch means when the bucket is elevated to dumping position, and power means for effecting positive opening and closing of the dump doors when the bucket is in elevated position.

Other objects and features of the invention will become apparent as the description proceeds, especially when taken in conjunction with the accompanying drawings, wherein:

Figure 1 is a fragmentary side elevation of the earth boring equipment.

Figure 2 is a fragmentary vertical section through the bucket and a portion of the platform.

Figure 3 is a section on the line 3—3, Figure 2.

Figure 4 is a section on the line 4—4, Figure 2.

Figure 6 is a view taken on the line 6—6, Figure 5.

Figure 7 is a vertical section through the top of the drive shaft and the supporting means therefor.

Figure 12 is a section on the line 12—12, Figure 3.

Figure 13 is a vertical section through a belled hole produced by the apparatus disclosed herein.

Figure 10:
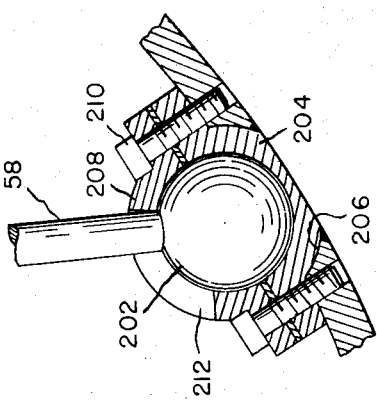
Figure 10 is a sectional view through one of the swivel connections between a toggle link and a belling blade.

Referring now to the drawings the earth boring apparatus as best seen in Figure 1, comprises a prime mover 10 which is herein illustrated as comprising a track 12, a platform supporting boom 14, and a bucket supporting boom 16. The bucket supporting boom 16 is provided with conventional means for raising and lowering the boring apparatus which includes a block 18 suspended from suitable hoisting means, and a hook 20 which is engaged with a bail 22 for supporting the boring structure.

The boring apparatus is controlled by hydraulic mechanism and for this purpose the prime mover will include suitable power means effective to drive a pump and suitable hydraulic lines extending to the boring apparatus as will be subsequently described.

Referring now to Figures 2, 3, 4, 5, 6, 9, 10, 11 and 12, the boring apparatus comprises a bucket 24 rigidly secured to the lower end of a vertical drive shaft 36 and provided with a pair of hingedly mounted outwardly swinging belling blades 26, and provided at its bottom with a pair of dump doors 28, each of which is provided with downwardly turned lips 30 to effect a digging operation as the bucket is rotated.

In the operation of the bucket the bucket is rotated as it is fed downwardly causing earth to be cut by the lips 30 and forced inwardly into the interior of the bucket 24. Periodically the bucket is raised from the hole and the earth is dumped by opening the bottom dump doors 28. When the hole has been bored to the desired depth the belling blades are gradually opened during rotation of the bucket, thus belling out the hole at the bottom to a desired extent.

The mechanism for effecting control of the belling blades 26 and the dump doors 28 includes a head structure indicated generally at 32 which is movable vertically within the bucket 24. The structure is guided by a tubular member 34 which is rigidly secured to the lower end of the drive shaft or kelly 36. The piston rod 82 at its lower end has a smaller rod 40 secured thereto which extends through a guide bushing 42 located at the lower end of the tubular member 34. At the lower end of the rod 40 there is provided a cross head 44 having upwardly extending rods 46 which connect to a block 48 slidable on the outer surface of the tubular member 34. Thus the head construction 32 is vertically movable in the bucket but is permitted rotational movement relative to the drive shaft or kelly for a purpose which will subsequently appear.

It is desired to produce outward swinging movement of the belling blades 26 in accordance with downward movement of the head 32. The means for accomplishing this purpose is best understood with reference to Figures 2, 5 and 9. Each of the doors 26 is hinged as indicated at 50 to the bucket 24 and each of the blades 26 in closed position constitutes a portion of the side wall of the bucket. A novel form of tripod toggle is employed for effecting controlled inward and outward swinging movement of the blades 26. The tripod toggle comprises a pair of links 52 and 54, each of which is provided with a limited universal joint connection 56 with the inner wall of the bucket. A third link 58 is provided with a similar limited universal joint 60 by means of which it is connected to the inner wall of one of the blades 26. The links 52, 54 and 58 converge upwardly and are interconnected at their upper ends by a cap 62, construction of which is best illustrated in Figure 6. The link 54 at its upper end is provided with a pivot connection 64 which extends between spaced ears 66 on the head 62. A pivot connection is established between the ears 66 and the pivot connection 64 by a pin 68, The remaining two links 52 and 58 are provided with universal swivel connections to the cap 62.

Figure 9:
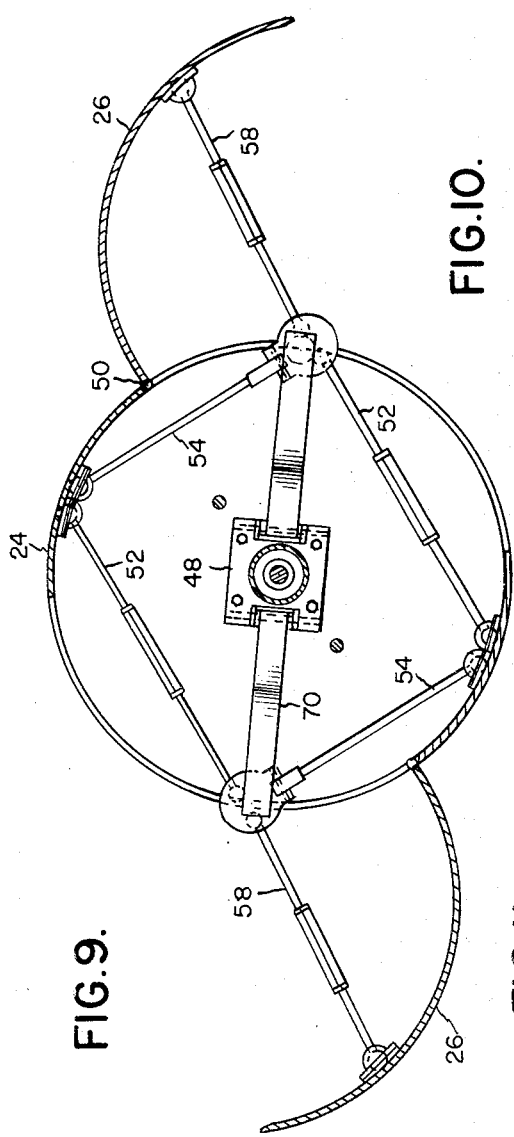
Figure 9 is a horizontal section through the bucket showing the belling blades in extended position.

The arrangement is such that when the cap 62 is forced downwardly it is guided outwardly by the conjoint motion of the links 52 and 54, thus moving the upper end of the link 58 downwardly and outwardly. At the same time the lower end of the link 58 moves the belling blades outwardly to the open position as indicated in Figure 9.

Downward motion of the cap 62 is produced by a link 70 which is pivoted as indicated at 72 to the ring 48. At its lower end the link 70 as best seen in Figure 6, has an enlarged headed portion 74 received within a cylindrical recess 76 formed in the cap 62. The cap 62 has a removable closure plate held in place by screws 78 to permit assembly of the parts. Thus it will be apparent that the cap 62 is rotatable about the axis of the link 70.

Means for effecting downward movement of the head 32 comprises a hydraulic cylinder 80 as best seen in Figure 7. Located within the cylinder is a suitable piston to which is connected a piston rod 82. The cylinder 80 is rigidly mounted adjacent the upper end of the hollow drive shaft 36 by a transverse pin 84.

As best seen in Figure 4, the shaft 36 is of square cross section and may conveniently be formed by welding together two angle irons. The piston rod 82 includes a tubular portion 86 which extends throughout the major length of the drive shaft and in the lower end of this tubular member is secured as by welding or otherwise, a block 88 to which the rod 40 is secured.

In order to simplify the power mechanism the cylinder 80 constitutes the sole power source on the digging apparatus, and it is supplied with hydraulic fluid under pressure from a pump located on the prime mover. In order to permit supply of hydraulic fluid under the control of the operator to the cylinder 80 during rotation of the drive shaft or kelly 36 the swivel valve indicated in Figure 7 is provided.

In Figure 7 there is shown a supporting structure comprising a plate 90 to which the bail 22 is secured. The plate 90 has bolted or otherwise secured thereto, a depending partial housing member 92 which includes a radially inwardly extending flange 94. Suitable bearings 96 are provided on the flange 94 and on top of these bearings is supported a flange 98 welded or otherwise suitably secured to the upper end of the drive shaft 36. Thus it will be apparent that the drive shaft 36 is freely rotatable relative to the supporting structure consisting of the plate 90 and the housing member 92.

Figure 8:
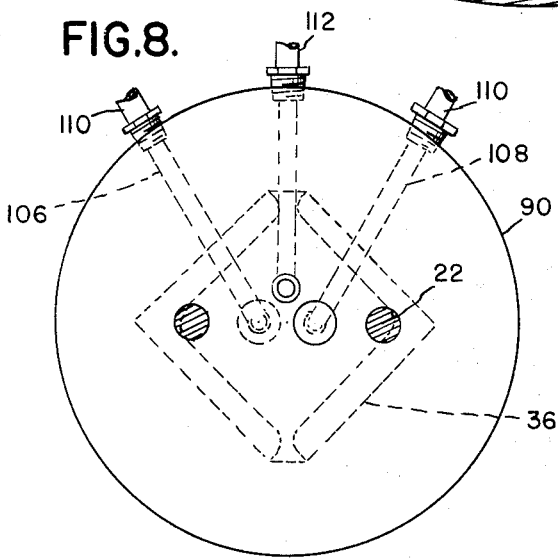
Figure 8 is a section on the line 8—8, Figure 7.

Extending downwardly from the plate 90 is a hydraulic supply core 100 having inlet and outlet passages 102 and 104 connecting with similar passages 106 and 108 respectively, provided in the plate 90. As best seen in Figure 8, the passages 106 and 108 may be connected by suitable pressure lines 110 to the pump or other source of hydraulic fluid under pressure. Preferably, there is also provided a drain line 112 for draining leakage fluid from the swivel valve. The core 100 is provided with an annular groove 114 communicating with the fluid passage 102 and with a second annular groove 116 communicating with the passage 104.

Suitably secured in the upper end of the shaft 36 for rotation therewith is a shell 118 having pressure and supply passages 120 and 122 having radially inwardly extending ports for connection with the annular grooves 114 and 116 respectively. Suitable sealing rings and gaskets are provided intermediate the core 100 and the shell 118. The construction is such that as the shaft 36 rotates relative to the supporting structure, fluid passages are maintained in communication. The passages 120 and 122 are respectively connected to opposite ends of the hydraulic cylinder 80 by hydraulic conduits 124 and 126. Control means preferably located in the cab of the prime mover are provided to alternately connect one of the conduits 110 to pressure and the other to exhaust selectively so as to control upward or downward movement of the piston 82.

In order to simplify the controls and mechanism means are provided for effecting opening and closing movement of the dump doors 28 by the agency of the same power means as controls movement of the belling blades. For this purpose each of the doors 28 is connected to a slide 130 best seen in Figures 2, 3, and 12. The slide 130 is mounted in a slideway indicated generally at 132 extending forwardly from a supporting plate 134 carried from the inner wall of the bucket 24 by struts 136. The slide 130, as best seen in Figure 2, is connected to a dump door 28 by means of a link 138. As will be readily apparent, upward movement of the slide 130 closes the corresponding dump door and downward movement of the slide 130 opens the corresponding dump door.

The supporting plate 134 is provided with a shoulder 140 adjacent its upper end and the slide 130 has pivotally secured thereto a latch member 142, the member being pivoted adjacent its upper end as indicated at 144 in Figure 12. Located within the slide 130 is a spring receiving pocket 146 in which is provided a compression spring 148 which biases the latch 142 to the full line position shown in Figure 12, at which time the lower right hand corner of the latch is seated on the shoulder 140 and effectively prevents downward motion of the slide 130.

Means are provided for releasing the latch 142 from the shoulder 140 and this means comprises a push rod 150 mounted in a block 152 located in one of the cross arms 154 by means of which the bucket 24 is rigidly connected to the drive shaft 36. The push rod 150 extends into an opening 156 in the supporting plate 134 and is biased upwardly to the full line position shown in Figure 12 by a compression spring 158 located in a pocket 160 formed in the block 152, the spring being retained in the pocket by a removable retainer plate 162. The lower end of the push rod 150 is adjacent an inclined camming surface 164 provided on the latch 142. The arrangement is such that when the bucket 24 is raised to its fully elevated position the upper end of the push rod 150 strikes an abutment portion 166, thus forcing the push rod downwardly and moving the latch 142 to the dotted line position shown in Figure 12. This releases the slide 130 for downward movement and it may at this time move downwardly by gravity if the head 32, which includes the block 48, is in a lowered position. However, the slide 130 includes an upper abutment 170 which overlies the block 48 and which will therefore prevent downward movement of the slide 130 if the block 48 is in uppermost position.

The pivoted latch element 142 has pivoted thereto a lower abutment element 172, this element being pivoted for rocking movement about the axis of a pivot pin 173. A compression spring 174 is located between the latch 142 and the abutment 172 and normally retains the abutment in outer position relative to the latch 142. The movable abutment 172 is provided with a lower camming surface 175 such that if the block 48 is located beneath the movable abutment 172 and is caused to move upwardly, the block will force the movable abutment 172 inwardly of the latch 142, thus permitting the block 48 to move upwardly past the lower abutment 172.

With the parts in the full line position shown in Figure 2, it will be observed that the latch 142 has been moved to unlatched position by the push rod 150 which has been depressed by the abutment 166. This has the effect of moving the lower movable or retractable abutment 172 in position to be engaged by the block 48. However, the block 48 is in its upper position corresponding to closed position of the belling blades 26. If now hydraulic fluid is admitted to the cylinder in a direction to cause the piston to move downwardly, the block 48 moves downwardly. Initial downward movement of the block 48 permits corresponding downward movement of the slide 130 and also corresponding opening movement of the doors 28. However, it may be that the material which has been excavated is a cohesive gluey mass, or for other reasons the doors 28 may not move toward open position by gravity. If they do not, continued downward movement of the block 48 brings it into engagement with the lower removable or retractable abutment 172, and further downward movement of the block 48 thus forces the doors 28 open. Of course downward motion of the block 48 at the same time swings the belling blades in open position which may further facilitate dumping the load from the bucket.

When the direction of flow of hydraulic fluid is reversed the piston moves upwardly and the block 48 closes the belling blades through the tripod linkage and will effect positive closing of the bottom dump doors by engagement between the block 48 and the fixed abutments 170 on the slides 130.

Figure 11:
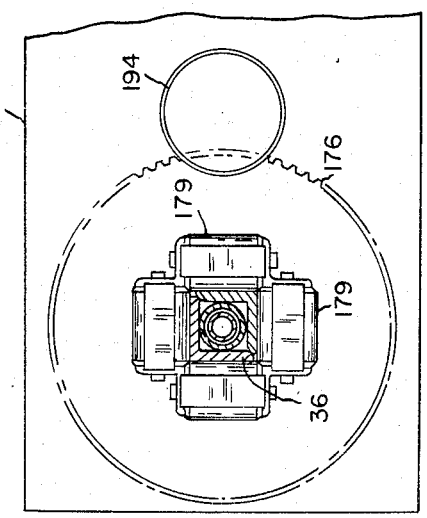
Figure 11 is a section on the line 11—11, Figure 1.

Referring now to Figure 2, means are provided for effecting positive rotation of the bucket 24 and this means is herein illustrated as comprising a bull gear 176 mounted on the platform 177, the gear 176 having a cage 178 rigidly secured thereto in which is mounted a plurality of rollers 179. The rollers 179 as best illustrated in Figure 11, are four in number and each engages one of the flat sides of the hollow square drive shaft 36. The bull gear 176 is driven by a drive pinion 180 clutched to a shaft 182 driven by a bevel gear 184, which in turn is driven by a cooperating bevel gear mounted on a shaft 186 (see Figure 1). Any suitable means may be effected for transmitting power from the prime mover to the pinion 180, but in Figure 1 this means is illustrated as comprising a sprocket chain 188 and sprockets 190 and 192. A suitable clutch as indicated generally at 194, is provided for transmitting motion from the shaft 182 to the pinion 180. The arrangement is such that positive driving torque is transmitted to the drive shaft 36 while the shaft may be raised or lowered vertically as required in the boring operation.

The means for effecting a rigid connection between the lower end of the drive shaft 36 and the bucket 24 is best illustrated in Figure 4, in which figure it will be noted that four bars 154 are connected between the bucket 24 and each other to form a cage in which the shaft 36 is located. Intermediate the inner walls of the bars 154 and the shaft 36 there are provided supports 200.

Referring now to Figure 10 there is illustrated the details of the connection between the toggle links and either the inner wall of the bucket or the inner surface of the belling blades. For this purpose each of the links such for example as 58, is provided with a ball 202 at its end which is received within a spherically shaped cup 204 herein illustrated as partially inserted within a correspondingly shaped opening 206 in the bucket wall or belling blade. The spheroidal enclosure is completed by a removable cap 208 bolted or otherwise secured to the cup 204 as indicated at 210. The cap 208 is provided with an enlarged opening 212 which is shaped to permit the required universal movement of the link 58. The specific construction illustrated in Figure 10 shows the universal connection of a link 58 to the interior surface of a belling blade. It will be appreciated that the construction employed for pivoting the lower ends of the links 52 and 54 to the inner surface of the bucket walls is similar.

Figure 5:
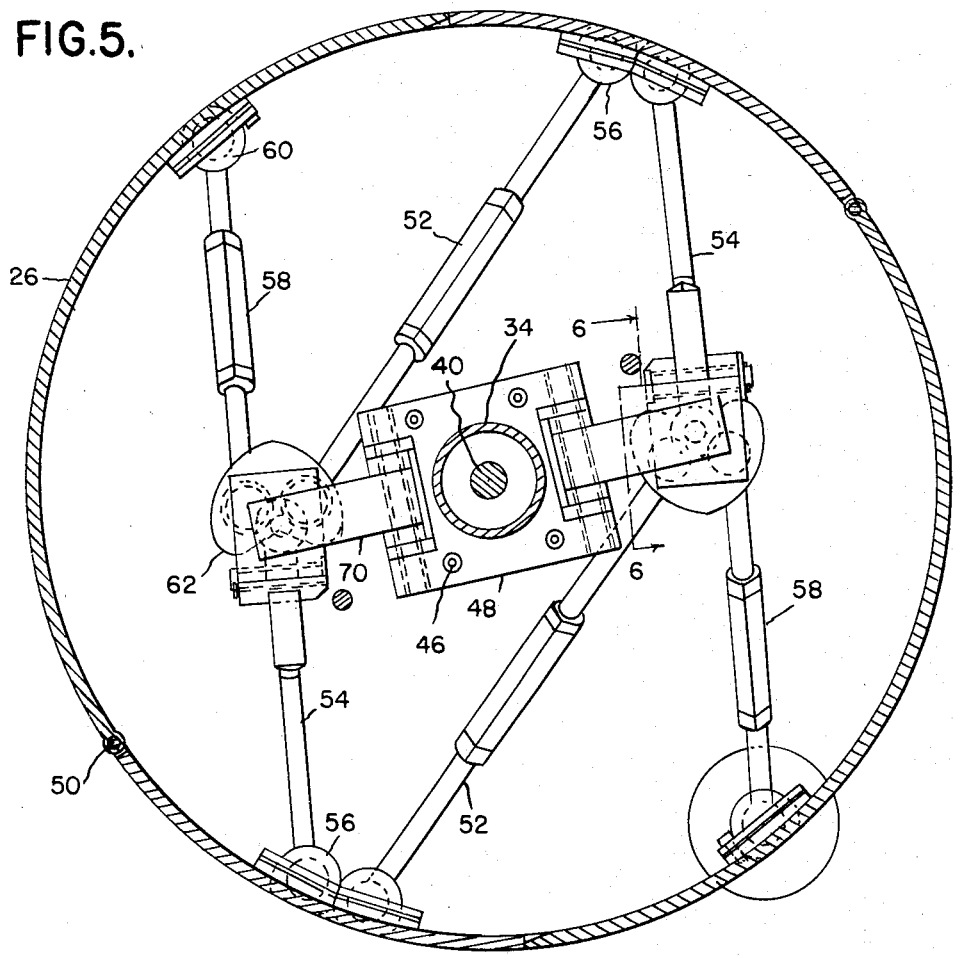
Figure 5 is a section on the line 5—5, Figure 2.

Comparing Figure 5 and Figure 9 it will be observed that the block 48 is required to rotate relative to the tubular member 34 as the belling blades 26 move to open position. Inasmuch as the block 48 is also depended upon to effect positive engagement with the retractable abutment 172, it will be understood that the block 48 has to be shaped to permit such relative rotation. The construction is illustrated in Figure 3 in which the corner portions 220 are shown as beveled. It will of course be understood that if desired these portions could be arcuate in character with the center of curvature at the center of the tubular member 34.

As the belling blades open the block 48 moves downwardly and also moves angularly about the axis of the tubular member 34. At the same time the cap 62 is permitted to rotate about the axis of the lower portion of the link 70 by virtue of the construction best illustrated in Figure 6. At the same time the link 54, which is provided with a pivot connection 68 to the cap 62, swings about its universal joint 56 and thus controls the position of the cap 62. Links 52 and 58, which have universal connections with the cap 62 as best illustrated in Figure 5, are moved along the predetermined paths to swing the belling blades to open position. Thus the tripod toggle linkage is provided with the necessary freedom of movement to effect positive direct control of the position of the belling blades without the possibility of the parts binding.

Due to the hydraulic connections provided by the construction illustrated in Figure 7, rotation of the shaft 36 relative to its supporting structure, does not interrupt the flow of hydraulic fluid. The supporting plate 90 may if desired be provided with a tie line or the like, for preventing or restricting rotation thereof as the shaft 36 is rotated, and this may be desirable since the plate 90 is suspended from the hook 20 which in turn is carried by a block 18 which in turn may carry pulleys for effecting raising and lowering of the boring apparatus by cable actuated in a conventional manner from the cab of the prime mover 10.

The present arrangement provides for a novel and extremely effective combined boring and belling device under complete control of a single operator who may control boring, belling and dumping in a convenient manner without moving from his operator's station in the vehicle. In ordinary boring the bucket is lowered to the ground and is rotated with the weight of the bucket and drive shaft urging the bucket into the ground. The rotation of the bucket forces earth into the bucket and the bucket may be elevated from the bored hole into engagement with the underside of the platform, thereby actuating latch release 150. At this time dumping is accomplished by energizing the hydraulic cylinder to force the head 32 downwardly. This will swing the belling blades outwardly. At the same time the bottom doors will drop open or if they fail to drop open by gravity, they will be forced open by engagement between the block 48 and the retractable abutment 172. Elevation of the head 32 will close the belling blades and the doors, and the doors will become latched upon initial downward movement of the bucket as the latch release 150 clears latch 142.

When the hole has been bored to proper depth, and with the bucket at the bottom of the hole, the belling blades may be extended in a controlled manner by downward movement of the head 32 and this of course takes place without affecting the bottom dump doors, which will remain latched. As the bucket becomes filled during the belling operation the belling blades are retracted by elevating the head 32 as is necessary to withdraw the loaded bucket out of the hole. At this time the bucket is elevated as in the previously described boring operation until the latch 142 is released by the latch release member 150. The head 32 is lowered and if the doors have failed to drop open by gravity they will be forced open by engagement between the block 48 and the retractable abutment 172.

Thus, the belling and boring operation is under the direct control of a single operator who is not required to leave his operator's station.

Figure 13 is a view illustrating the type of hole which may be bored with the present apparatus, this hole including a laterally belled portion 230 and an upper reduced cylindrical portion 232.

The drawings and the foregoing specification constitute a description of the improved earth boring apparatus is such full, clear, concise and exact terms as to enable any person skilled in the art to practice the invention, the scope of which is indicated by the appended claims.

What we claim as our invention is:

1. Earth boring apparatus comprising a boring and belling device comprising a rigid drive shaft and a bucket secured to the lower end of said drive shaft, bottom dump doors hinged on said bucket, laterally swinging belling blades on said bucket, a power source on said device, means connecting said source to said blades for moving said blades in or out, selectively operable means for connecting said cource to said doors to open and close said doors, said drive shaft being hollow, said power source comprising a hydraulic cylinder and piston located in said shaft, and a piston rod extending from said piston beyond the lower end of said shaft into said bucket.

2. Apparatus as defined in claim 1 in which the means connecting said source to said blades comprises a head mounted for vertical movement in said bucket, means connecting said head to said piston rod, and toggle linkage connecting said head to said blades.

3. Apparatus as defined in claim 2 in which said selectively operable means comprises a slide, an abutment on said slide in position to engage the top of said head, a movable abutment on said slide selectively movable from retracted position into position to engage the bottom of said head, latch means operable in conjunction with said movable abutment effective to retain said slide in up position when said movable abutment is in retracted position, and links connecting said slide to one of said doors.

4. Earth boring apparatus comprising a platform, a boring and belling device comprising a rigid drive shaft vertically movable through said platform and a bucket secured to the lower end of said shaft, means for rotating said shaft, means for raising and lowering said shaft, bottom dump doors on said bucket, a latch for normally retaining said doors closed, a latch release comprising a member engageable with the underside of said platform when said bucket is elevated and movable thereby to latch releasing position, side belling blades on said bucket, power means including a member vertically movable in said bucket, linkage connecting said member to said blades, and selectively operable linkage connecting said member to said doors.

5. In earth boring apparatus, a bucket having bottom dump doors and side belling blades, power means comprising a head movable vertically in said bucket, rigid linkage permanently connecting said head to said blades, separate rigid linkage for connecting said head to said doors, and selectively operable means for connecting and disconnecting said separate linkage from said head.

6. In earth boring apparatus, a bucket having portions of its side walls hinged for lateral swinging movement to constitute belling blades, means for actuating said blades comprising a head vertically movable in said bucket, tripod toggles each comprising a pair of links pivoted to the inner wall of said bucket at widely spaced points, a cap pivoted to the upper ends of said pair of links, a third link pivoted at one end to said cap and at the other end to one of said blades, and a link connecting each of said caps to said head.

7. In earth boring apparatus, a bucket having portions of its side walls hinged for lateral swinging movement to constitute belling blades, means for actuating said blades comprising a head mounted for vertical movement and for angular movement about a vertical axis in said bucket, a pair of caps located in said bucket below said head, links connecting said caps to said head, a tripod toggle connected to each of said caps comprising a pair of links pivoted at their lower ends to the inner wall of said bucket at points spaced substantially apart circumferentially thereof, and a third link pivoted at its lower end to the inner wall of one of said blades, the upper end of the links of the tripod toggle joint being pivotally connected to said cap.

8. In a belling bucket, a belling blade hinged for lateral swinging movement, a tripod toggle for effecting swinging movement of said blade, said toggle comprising three links, a cap to which the upper ends of said three links is pivotally secured, means pivotally mounting the lower ends of two of said links to the inner wall of said bucket, means pivotally securing the lower end of the third link to the inner wall of said blade, a slide mounted for vertical movement in said bucket, and means connecting said slide and said cap.

9. In a boring and belling bucket, belling blades on said bucket, a bottom dump door on said bucket, means for actuating said blades comprising a vertically movable member in said bucket, means for selectively opening and closing said door comprising a vertically movable slide in said bucket, a link connecting said slide and said door, a retractable abutment on said slide, and means for selectively moving said abutment into or out of the path of said member.

10. In a boring and belling bucket, belling blades on said bucket, a bottom dump door on said bucket, means for actuating said blades comprising a vertically movable member in said bucket, means for selectively opening and closing said door comprising a vertically movable slide in said bucket, a link connecting said slide and said door, a fixed abutment on said slide overlying said member, a latch effective to retain said slide in upper position, a retractable abutment on said slide, said latch and retractable abutment being coordinated such that upon movement of said latch to release position, said retractable abutment is moved to position beneath said member for actuation thereby on downward movement of said member.

11. Apparatus of the character described in claim 10 in which said retractable abutment has a camming surface engageable by said member on upward movement of said member, and resilient means providing for movement of said retractable abutment out of the path of said member.

12. Earth boring apparatus comprising a platform, a boring and belling device comprising a rigid drive shaft vertically movable through said platform and a bucket secured to the lower end of said shaft, means for rotating said shaft, means for raising and lowering said shaft, bottom dump doors on said bucket, side belling blades on said bucket, power means including a member vertically movable in said bucket, means connecting said member to said blades, a vertically movable slide in said bucket for each of said doors, a link connecting said slide to its associated door, a slideway in which said slide is movable, a latch movable relative to said slide, said slideway having a shoulder in which said latch seats to retain said slide in upper position, an abutment element on said latch, a latch actuator, means operable on movement of said bucket to predetermined raised position to operate said latch actuator to release said latch and to move said abutment element to position to be engaged by said member on downward movement thereof, and a fixed abutment on said slide in position to be engaged by said member on upward movement thereof.

13. Apparatus as defined in claim 12 in which said abutment element is provided with yieldable mounting means providing for upward movement of said member thereover.

14. Earth boring apparatus comprising a first boom, a platform on said boom, a second boom extending above said platform, a rigid hollow drive shaft suspended from said second boom and passing through said platform, means on said platform for rotating said shaft, a bucket carried at the lower end of said shaft, hinged belling blades and a hinged bottom dump door on said bucket, a hydraulic piston and cylinder at the upper end of said shaft, a piston rod in said shaft connected at its upper end to said piston and extending below said shaft into said bucket, means operably connecting said rod to said blades and to said door to open and close said door and to swing said blades in and out.

15. Apparatus as defined in claim 14 comprising a member actuated by an abutment on said platform by elevation of said bucket to elevated position directly beneath said platform to disconnect said rod from said door except when said bucket is in elevated position.

16. Hole boring and belling apparatus comprising a vertical rotary drive shaft, means for driving said shaft, means for raising and lowering said shaft, a bucket rigidly carried by the lower end of said shaft, a digging and dump door hinged to the bottom of said bucket, a pair of laterally swinging extensible and retractable belling blades at the sides of said bucket, a vertically movable block mounted within said bucket, actuating means for moving said block vertically, links permanently connecting said block to said blades to extend and retract said blades upon respective downward and upward movement of said block, a slide vertically movable in said bucket, a link permanently connecting said slide to said door to close and open said door upon respective upward and downward movement of said slide, abutment means on said block and slide engageable upon upward movement of said block and effective to move said slide to door closing position upon movement of said block to blade retracting position.

17. Structure as defined in claim 16 comprising latch means on said bucket and slide effective to hold said slide in elevated door closing position during vertical movement of said block.

18. Structure as defined in claim 17 comprising a latch release member, and means engaging said member to release said latch upon predetermined raising of said bucket.

19. Structure as defined in claim 18 in which said latch means includes an abutment element movable into the path of downward movement of said head upon release of said latch means, whereby subsequent downward movement of said block extends said blades and forces said door to open position.

20. Structure as defined in claim 19 in which said abutment element is retractable to permit said block to slide over it upon upward movement of said block.

21. Earth boring apparatus comprising a rigid drive shaft, means for raising and lowering said drive shaft and for rotating said drive shaft, a combined boring and belling bucket rigidly connected to the lower end of said drive shaft, said bucket having bottom dump doors hinged thereto for vertical swinging movement, and belling blades hinged thereto for lateral swinging movement, a first member mounted within said bucket for vertical sliding movement, power means for raising and lowering said first member, links connecting said first member and said blades to swing said blades out and in as said first member moves respectively downwardly and upwardly, a second member mounted within said bucket for vertical sliding movement, links connecting said second member to said doors to open and close said doors as said second member moves respectively downwardly and upwardly, and abutment means on said members engageable as said first member is moved upwardly to thereby raise said second member.

22. Structure as defined in claim 21 which comprises second abutment means on said members including a movable abutment on one of said members engageable as said first member is moved downwardly to thereby move said second member downwardly, said movable abutment having a camming surface thereon engageable by the other abutment of said second abutment means to move said movable abutment out of the path of said other abutment.

23. Structure as defined in claim 22 which comprises latch means operable to retain said second member in raised position, and latch release means operable to release said latch when said bucket is fully raised, said second abutment means being operable to move said second member downwardly to open said doors upon downward movement of said first member.

24. Earth boring and belling apparatus comprising a bucket having belling blades hinged to its sides and dump doors hinged to its bottom, a first member mounted in said bucket for vertical sliding movement therein, an abutment on said first member, linkage connecting said first member to said blades, power means for raising and lowering said first member to swing said blades respectively in and out, a second member mounted in said bucket for vertical sliding movement therein, linkage connecting said second member to said doors to close and open said doors as said second member is moved respectively up and down, a combined latch and abutment device on said second member, a latch part cooperable with said device effective to retain said second member in raised position, a latch release element operated by elevation of said bucket to its fully raised position to move said device to latch release position, said device having an abutment part moved by movement of said device to latch release position into the path of the abutment on said first member to be engaged by said abutment upon downward movement of said first member to force said doors open.

25. Structure as defined in claim 24 in which said abutment part is movable on said device and includes a camming surface engageable by the abutment on said first member to move said part out of the path of said abutment as said first member is raised.

26. Structure as defined in claim 25 in which said second member includes a fixed abutment overlying the abutment on said first member and spaced above said device so that upward movement of said first member raises said second member.

27. Structure as defined in claim 26 in which said device in latching position positions said abutment part out of the path of the abutment on said first member so that said first member may move vertically to swing said blades in and out without affecting said doors.

References Cited in the file of this patent

UNITED STATES PATENTS

| Number | Name | Date |
|---|---|---|
| Re. 21,241 | Bertran et al. | Oct. 24, 1939 |
| 1,236,940 | Huesselmann | Aug. 14, 1917 |
| 1,641,926 | Genung | Sept. 6, 1927 |
| 1,731,732 | Terrell | Oct. 15, 1929 |
| 1,787,001 | Hunt et al. | Dec. 30, 1930 |
| 1,870,050 | Hunt | Aug. 2, 1932 |
| 1,905,995 | Bertran | Apr. 25, 1933 |
| 1,916,688 | Smith | July 4, 1933 |
| 1,999,115 | Shinn | Apr. 23, 1935 |
| 2,123,897 | Holmes | July 19, 1938 |
| 2,178,852 | Dunlap, Jr. | Nov. 7, 1939 |
| 2,310,460 | Randolph | Feb. 9, 1943 |
| 2,499,508 | Karhu | Mar. 7, 1950 |
| 2,500,931 | Curtis | Mar. 21, 1950 |
| 2,631,013 | Darin | Mar. 10, 1953 |